(12) United States Patent
Dakwar et al.

(10) Patent No.: US 11,833,593 B2
(45) Date of Patent: Dec. 5, 2023

(54) SQUARE-SHAPED INSERT FOR BAR-PEELING AND INSERT-HOLDER TOOL FOR SAME

(71) Applicant: Iscar, Ltd., Tefen (IL)

(72) Inventors: Amjad Dakwar, Tarshiha (IL); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/108,248

(22) Filed: Dec. 1, 2020

(65) Prior Publication Data

US 2021/0245258 A1 Aug. 12, 2021

Related U.S. Application Data

(60) Provisional application No. 62/975,259, filed on Feb. 12, 2020.

(51) Int. Cl.
*B23B 5/12* (2006.01)
*B23B 27/16* (2006.01)

(52) U.S. Cl.
CPC ............ *B23B 5/12* (2013.01); *B23B 27/1622* (2013.01); *B23B 2200/0476* (2013.01)

(58) Field of Classification Search
CPC ... B23B 5/12; B23B 2220/40; B23B 27/1622; B23B 27/1614; B23B 27/1611; B23B 27/1603; B23B 27/1651; B23B 27/1644; B23B 27/164; B23B 27/1625; B23B 2200/0476; B23B 2200/0471; B23B 2200/125; B23B 2200/208; B23B 2210/02; B23B 29/04; B23C 2200/0461; B23C 2200/0455; B23C 2200/125; B23C 2200/208; B23C 5/202
See application file for complete search history.

(56) References Cited

U.S. PATENT DOCUMENTS

| | | | |
|---|---|---|---|
| 4,645,384 A | * | 2/1987 | Shimomura .......... B23C 5/2243 408/199 |
| 4,681,488 A | | 7/1987 | Markusson |
| 4,880,338 A | | 11/1989 | Stashko |

(Continued)

FOREIGN PATENT DOCUMENTS

| | | |
|---|---|---|
| DE | 27 34 095 | 2/1978 |
| DE | 2820810 | 11/1979 |

(Continued)

OTHER PUBLICATIONS

International Search Report dated May 19, 2021, issued in PCT counterpart application (No. PCT/IL2021/050084).

(Continued)

*Primary Examiner* — Nicole N Ramos
(74) *Attorney, Agent, or Firm* — Womble Bond Dickinson (US) LLP

(57) ABSTRACT

A square-shaped bar-peeling insert and insert-holder designed with pockets to hold two such square-shaped inserts. Each insert has four peripheral sub-surfaces and corners. Between each adjacent pair of corners is a cutting edge which includes a straight wiper sub-edge and two at least partially curved peeling sub-edges respectively located on opposing sides of the wiper sub-edge. The corners of the insert are inwardly disposed relative to an imaginary square formed by the sub-edges.

23 Claims, 4 Drawing Sheets

(56) References Cited

U.S. PATENT DOCUMENTS

| | | | |
|---|---|---|---|
| 5,032,049 A | 7/1991 | Hessman et al. | |
| 5,256,008 A | 10/1993 | Hansson et al. | |
| 5,282,703 A | 2/1994 | Itaba et al. | |
| 5,807,031 A | 9/1998 | Arai et al. | |
| 5,947,651 A | 9/1999 | Murakami et al. | |
| 6,039,515 A | 3/2000 | Lamberg | |
| 6,146,065 A | 11/2000 | Isaksson | |
| 6,196,771 B1 | 3/2001 | Andersson | |
| 6,742,969 B1 | 6/2004 | Hoefler | |
| 6,945,740 B2 | 9/2005 | Svenningsson et al. | |
| 6,957,935 B2 | 10/2005 | Sung et al. | |
| 7,220,083 B2 | 5/2007 | Festeau et al. | |
| 7,553,112 B1 | 6/2009 | Hecht et al. | |
| 7,972,092 B2 | 7/2011 | Baernthaler et al. | |
| 8,328,472 B2 * | 12/2012 | Choi | B23C 5/202 407/113 |
| 8,523,497 B2 * | 9/2013 | Uno | B23C 5/202 407/42 |
| 8,585,331 B2 | 11/2013 | Park et al. | |
| 9,481,039 B2 | 11/2016 | Park | |
| 2012/0051856 A1 | 3/2012 | Park et al. | |
| 2012/0070242 A1 | 3/2012 | Choi et al. | |
| 2012/0282048 A1 * | 11/2012 | Kountanya | B23B 27/145 407/113 |
| 2013/0101364 A1 * | 4/2013 | Dufour | B23B 27/145 407/115 |
| 2013/0156515 A1 * | 6/2013 | Satran | B23C 5/06 407/113 |
| 2014/0193216 A1 * | 7/2014 | Maeta | B23B 27/1611 407/113 |
| 2014/0199127 A1 * | 7/2014 | Imai | B23C 5/202 407/42 |
| 2014/0341660 A1 | 11/2014 | Cheon | |
| 2015/0043981 A1 * | 2/2015 | Nagami | B23C 5/06 407/113 |
| 2015/0328689 A1 | 11/2015 | Wernh | |
| 2017/0120351 A1 * | 5/2017 | Fang | B23C 5/205 |
| 2017/0282262 A1 * | 10/2017 | Burtscher | B23C 5/06 |
| 2018/0111205 A1 * | 4/2018 | Ishi | B23B 27/1611 |
| 2019/0054542 A1 | 2/2019 | Huber et al. | |

FOREIGN PATENT DOCUMENTS

| | | |
|---|---|---|
| DE | 29815761 | 1/2000 |
| FR | 2483819 | 12/1981 |

OTHER PUBLICATIONS

Written Opinion dated May 19, 2021, issued in PCT counterpart application (No. PCT/IL2021/050084).

* cited by examiner

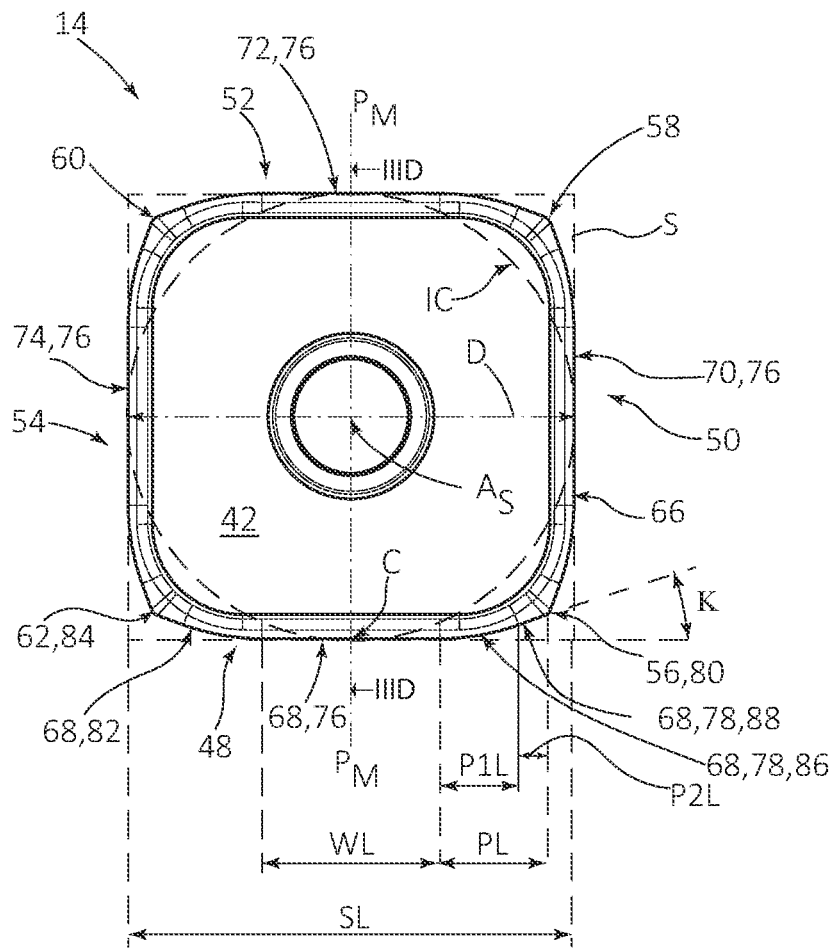
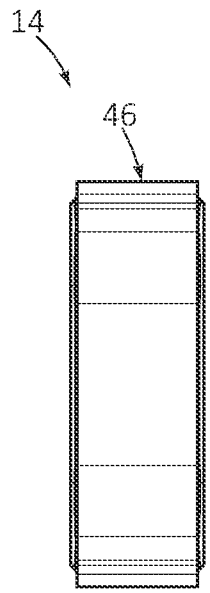
Fig. 3B
Fig. 3C
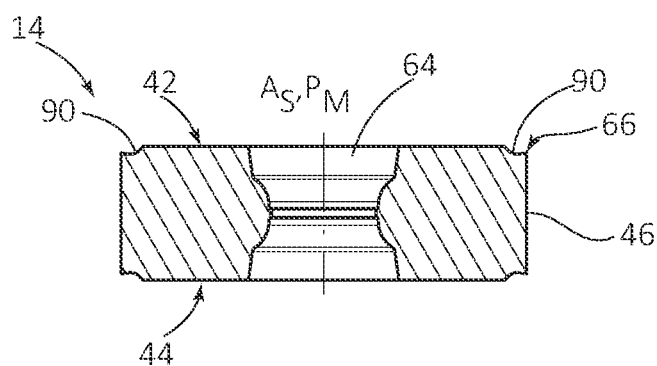
Fig. 3D

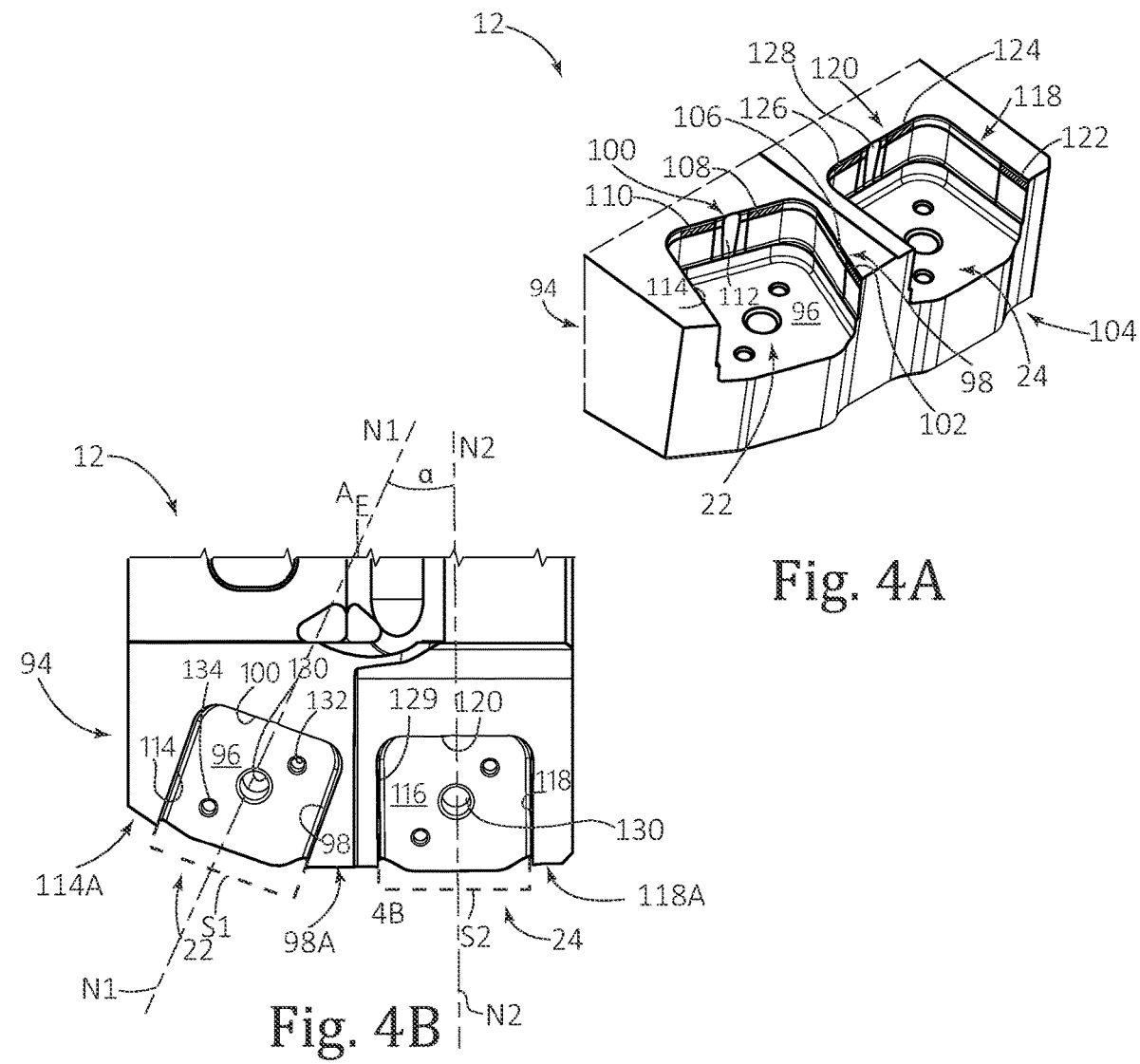
Fig. 4A
Fig. 4B
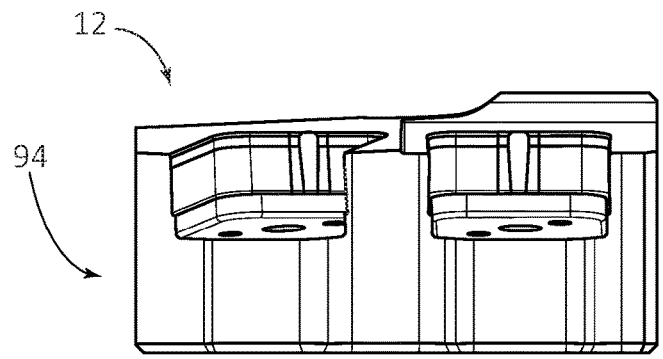
Fig. 4C

SQUARE-SHAPED INSERT FOR BAR-PEELING AND INSERT-HOLDER TOOL FOR SAME

RELATED APPLICATIONS

The present application claims priority to U.S. Provisional Patent Application No. 62/975,259 filed Feb. 12, 2020. The contents of the aforementioned application are incorporated by references in their entirety.

FIELD OF THE INVENTION

The subject matter of the present application relates to a bar-peeling insert, insert-holder and tool assembly comprising same. More particularly, the subject matter is directed to a square-shaped bar-peeling insert and insert-holder for holding the square-shaped insert.

BACKGROUND OF THE INVENTION

Bar-peeling is a machining operation which differs from both a standard turning operation in which the workpiece is rotated and from a standard milling operation in which the cutting tool rotates and the workpiece is static. Generally speaking, in a bar-peeling operation an elongated bar is moved (relatively) in an axial direction through an area where a bar-peeling cutting tool assembly is located, and a peeling head rotates around the bar 'peeling' away the outer layer.

Such operations are characterized as very "rough" machining operations with large chip loads and resulting high forces on the cutting insert and cutting assembly, as well as instability with substantial resultant vibration being typical.

FIG. 1 of U.S. Pat. No. 5,256,008 shows in a schematic representation of a conventional bar-peeling operation useful for understanding.

The disclosure of U.S. Pat. No. 5,256,008 is directed to a tool assembly for a peeling operation in which the toolholder is provided with a roughing insert with convexly curved cutting edges and a finishing insert with basically linear cutting edges. In the present application the bar-peeling insert positioned to first contact a workpiece (hereinafter alternatively called "bar") will be called a roughing bar-peeling insert (or for conciseness "roughing insert"), and the bar-peeling insert positioned to subsequently contact the workpiece will be called a finishing bar-peeling insert (or for conciseness "finishing insert").

DE 35 40 665 A1, appears to exemplify a similar overall concept of a curved roughing insert (made of multiple pieces) followed by a straight-edged finishing insert.

DE 2 820 810 discloses an elongated two-edged insert in which each of the edges has what will be called hereinafter a peeling sub-edge and a wiper sub-edge. The peeling sub-edge, as well as being inclined at a different angle to the wiper sub-edge, is itself further inclined at two different angles, this being for the stated purpose of reducing the risk of edge breakage. The reason given is that a curved shape (the two different angles) is beneficial to prevent breakage but reduces surface finish. It is understood from the disclosure that the use of an elongated insert allows also a large depth of cut to be made.

In a publication published many years after DE 2 820 810, a similar insert is disclosed in U.S. Pat. No. 7,972,092 with the difference seemingly being that the insert has not only two different angles at the main edge but numerous radii.

Notably, in FIGS. 1A-1E what is described as prior art insert shapes are shown. Notably they are mostly elongated with one insert shape being basically triangular. It is also noted in the background that peeling inserts have a peeling sub-edge and a wiper sub-edge (also called a smoothing cutting edge). It is also explained that the smoothing cutting edge also acts in a supporting manner for the machined bar and guides it centrally in the peeling head.

FR 2 483 819 appears to show a convexly curved triangular-shaped insert, and an embodiment in which three such inserts are used together.

Some general observations can be made regarding the prior art cutting insert shapes described above. Commonly, prior art inserts have an elongated shape allowing the increased depth of cut and stabilizing effect described in the prior art publications, or a triangular type shape which is known in the art to be more stable giving the cutting force directions for a bar-peeling operation.

Only one prior art publication has been found in which a generally square-shaped peeling insert is disclosed, namely DE 298 15 761 U1. The cutting insert disclosed is similar to the elongated inserts of the prior art in that it has a peeling sub-edge and an elongated wiper (smoothing) sub-edge. Of particular interest is that an insert-holder enabling the holding the cutting insert is not disclosed. The relevance of this is the challenge that stably mounting a square insert for a bar-peeling operation has not been disclosed.

US 2019/0054542 is the most recent publication found by the Applicant in relation to bar-peeling inserts and discloses a cutting insert with even more cutting edges than DE 298 15 761 U1, namely five or six pairs of peeling and wiper sub-edges per side (i.e. a pentagonal or hexagonal cutting insert). Given that the cutting insert disclosed can be double-sided, the cutting insert may have ten or twelve cutting edges (i.e. each cutting edge being a pair of peeling and wiper sub-edges).

It is an object of the present invention to provide a new and improved bar-peeling insert and insert-holder therefor.

A separate object of the present invention is a new shim.

It will be understood that cutting inserts are not perfect polygonal shapes, and that the words, "square-shaped" means that a square is the closest regular shape (alternatively "basic square-shaped", "near-square-shaped" could be used). This is in similarity with prior art inserts described as pentagonal, hexagonal, triangular or trigon, etc.

SUMMARY OF THE INVENTION

The present invention is directed to providing a more versatile bar-peeling insert than is known hitherto.

In accordance with a first aspect of the subject matter of the present application, there is provided a square-shaped bar-peeling insert comprising a cutting edge; the cutting edge comprising: a straight wiper sub-edge and at least partially curved first and second peeling sub-edges respectively located on opposing sides of the wiper sub-edges and connecting the wiper sub-edge to an adjacent corner.

The provision of two opposing at least partially curved peeling sub-edges on a single side of a bar-peeling insert allows increased versatility over the prior-art in that the bar-peeling insert consequently has an additional peeling sub-edge.

Preferably the first and second peeling sub-edges are mirror symmetric about the center of the wiper-sub-edge While the provision of additional cutting edges to a cutting insert would seem intuitive, the reason why prior art bar-peeling inserts do not such construction must be explained.

A first reason is that the wiper sub-edge is conventionally significantly elongated from the peeling sub-edge to the end, or basically the end, of the bar-peeling insert. This is because bar-peeling is an extremely rough machining operation and said wiper sub-edge not only provides a wiper function but also a stabilizing function, as noted above in the explanation of U.S. Pat. No. 7,972,092. So called wiper sub-edges of other machining applications are typically relatively far small (e.g. 1 mm) because their entire function is to produce finish and not to stabilize, which differs from bar-peeling inserts in which the wiper sub-edge is typically significantly longer than even the so-called "peeling sub-edge".

A second reason that the wiper sub-edge is elongated is to allow greater depth of cut as noted above in reference to the explanation of DE 2 820 810.

It is axiomatic that by adding an additional peeling sub-edge as per the present invention, the overall length of the wiper sub-edge is reduced from that which could be provided for a similar sized bar-peeling insert (reducing stability and depth of cut).

However, it will be understood below in connection with FIG. 5B that for the present versatile bar-peeling insert which is used not only for a finishing purpose (and hence having this disadvantage) but also for a roughing surface, at least for one of the two proposed uses this disadvantage does not occur.

Further, known bar-peeling insert-holders are not designed to work in two directions and hence an end user would only require one peeling sub-edge at a side of a cutting insert. Therefore, there is no immediate apparent benefit to add a second peeling sub-edge.

Hence it is not obvious to reduce the functionality of the elongated wiper sub-edge shown in prior art publications.

Thus a first advantage, related to versatility of the insert, provided is that the same bar-peeling insert is able to be used in both left and right insert-holders which is believed to outweigh the disadvantage of the loss of a portion of the wiping/stabilizing sub-edge.

Additionally, unlike other machining operations, the peeling sub-edge is relatively short compared to the wiper sub-edge and the loss of function of the wiper sub-edge is less than for other applications.

However, the loss of the stabilizing length is notable particularly because the bar-peeling insert here is square-shaped and not elongated as per some of the prior art inserts, making the loss of length of the wiper sub-edge more notable.

Accordingly, to compensate for the loss of stabilizing effect, it is preferred that the bar-peeling insert be relatively large for a cutting insert. For example, it is preferred that an inscribed circle IC of the bar peeling insert have a diameter D fulfilling the condition: $D \geq 30$ mm, more preferably $D \geq 35$ mm. Nonetheless, such bar-peeling inserts are typically made of relatively expensive cemented carbide and large inserts are more difficult to press, hence it is preferred that they not be made larger than needed. Hence it is preferred that the inserts fulfill the condition: $D \leq 45$ mm, more preferably $D \leq 40$ mm.

A separate significant advantage relating to versatility is that the same peeling insert can also be used as the roughing bar-peeling insert in which the entire cutting edge along one side thereof, including even the second peeling sub-edge, is utilized (see FIG. 5B).

Stated differently, for at least one of either the two advantages described above, the provision of the additional peeling sub-edge is believed to outweigh the disadvantage of the extra cost of an enlarged cutting insert and/or the shortening of the wiper sub-edge typically thought beneficial for a bar-peeling insert.

It will be understood that such advantageous construction can be applied to more than one and preferably all sides of a bar-peeling insert.

Accordingly, in accordance with a second aspect of the subject matter of the present application, there is provided a square-shaped bar-peeling insert comprising: a first rake surface and a second surface located opposite thereto; an insert peripheral surface connecting the first rake surface and second surface; and a first cutting edge extending along an intersection of the insert peripheral surface and the first rake surface; the insert peripheral surface comprising first, second, third and fourth peripheral sub-surfaces and first, second, third and fourth corners connecting the first, second, third and fourth peripheral sub-surfaces; wherein, in a plan view of the first rake surface, between each adjacent pair of the each of the first, second, third and fourth corners, the first cutting edge defining a first imaginary square and comprising: a straight wiper sub-edge; and an at least partially curved first peeling sub-edge connecting the wiper sub-edge to the first corner; an at least partially curved second peeling sub-edge connecting the wiper sub-edge to the second corner; the first and second peeling sub-edges respectively located on opposing sides of the wiper sub-edge; wherein, in a plan view of the first rake surface: each of the first and second, corners are located spaced inwardly from the imaginary square.

Notably, preferred yet optional features mentioned above (i.e. the mirror symmetry of the bar-peeling and insert size) are equally applicable to all insert aspects.

Preferably, in a plan view of the first rake surface: each of the first, second, third and fourth peripheral sub-surfaces is associated with a wiper sub-edge which defines said imaginary square and each of the first, second, third and fourth corners are located spaced inwardly from the imaginary square.

Corners spaced inwardly as described (or stated differently "recessed inwardly") are typically considered disadvantageous for cutting inserts which normally have significant radiused or round corners to increase tool-life. It will be understood that sharper corners are more prone to breakage. However, for the given application of bar-peeling, a sharp corner or as defined above an inwardly spaced corner allows more of the cutting edge to be utilized. Notably, unlike other machining operations the corner of a bar-peeling insert is not intended to machine a workpiece.

It should be understood that an alternative definition to the corners being "located spaced inwardly from the imaginary square" could be that the corners are, in a plan view of the first rake surface, sharp-edged corners (i.e. as opposed to round-edged corners). The same is applicable for preferred embodiments with a cutting edge along the second surface.

The above-defined aspects allow a square bar-peeling insert to have eight bar-peeling edges which is an improvement over the known triangular inserts. While triangular inserts have a more straight-forward stable mounting arrangement, the present application will detail a stable mounting configuration for a square-shaped insert below.

While it may be noted that US 2019/0054542 discloses a bar-peeling insert with even more edges, the present invention is thought advantageous at least for the longer wiper (and stabilizing) sub-edge and overall machining depth length along one side of the insert as shown in the roughing bar-peeling insert in FIG. 5B.

In accordance with any of the aspects above and below, preferably a bar-peeling insert according to the present invention is reversible (i.e. a double-sided insert). In other words, opposite to the first rake surface is a second rake surface forming a second cutting edge with the insert peripheral surface. Stated differently, the second surface mentioned above and in the claims can be a second rake surface.

Preferably, the second rake surface can be identical to the first rake surface, but at the very least comprises a cutting edge configured for a bar-peeling operation to be formed on a second surface located opposite the rake surface. Stated differently, the second cutting edge can comprise the same features as the first cutting edge.

The words second surface in the specification and claims refer to a second "rake" surface (even if the name "second surface" remains for ease of readability) after it is indicated that such surface is a rake surface (e.g. formed with a cutting edge extending along the intersection thereof with the insert peripheral surface).

It will be understood that it is highly preferred that all cutting edges be located adjacent to a chip-former arrangement, such as a groove (certainly for embodiments where the cutting insert itself is a negative insert and a positive edge is needed for compensation).

It will be understood that a double-sided insert can double the number of cutting edges. Meaning that if along a single side of the square-shaped insert there are two peeling sub-edges, consequently there can eight peeling sub-edges on each rake surface.

However, due to the rough usage of the wiper sub-edge (meaning it will undergo more wear than wiper sub-edges of other machining applications) it is still only expected that each cutting edge along each side will on only undergo a single use (until wear causes it to be unusable). Meaning that an unusual design occurs, for example, even if the bar-peeling insert has 16 peeling sub-edges, it is still only expected to be used as an eight-way indexable insert.

The above-described double-sided insert is preferably a result of the insert being a negative insert (i.e. wherein the insert peripheral surface extends perpendicular relative to both the first rake surface and second surface) since this is an extremely efficient type of insert to manufacture (even though to provide relief the bar-peeling insert will likely require a negative mounting position).

Nonetheless, aside from the preferred negative arrangement, other options are feasible. For example, the insert peripheral surface being formed with an inward concave shape (i.e. a dovetail arrangement as known in the art) may be preferred for additional mounting stability, etc.

Accordingly, in accordance with a third aspect of the subject matter of the present application, there is provided a square-shaped bar-peeling insert comprising: a first rake surface and a second rake surface located opposite thereto; an insert peripheral surface connecting the first rake surface and second surface; and a first cutting edge extending along an intersection of the insert peripheral surface and the first rake surface; the insert peripheral surface comprising first, second, third and fourth peripheral sub-surfaces and first, second, third and fourth corners connecting the first, second, third and fourth peripheral sub-surfaces; wherein, in a plan view of the first rake surface, between each adjacent pair of the each of the first, second, third and fourth corners, the first cutting edge comprises: a straight wiper sub-edge defining an imaginary square with the other wiper edges of the same cutting edge; and a single peeling sub-edge connecting an adjacent one of the wiper sub-edges to an adjacent corner; wherein the second rake surface is mirror symmetric to the first rake surface.

The above construction could, for example be that the bar-peeling insert presents a cutting edge shape similar to that shown in FIG. 1 of DE 298 15 761 U1, yet on both rake surfaces of the bar-peeling insert. For example, this could be accomplished with a negative arrangement or inward concave shape along the peripheral surface as exemplified below.

While it would appear trivial to merely make two opposing rake surfaces of a single cutting insert to be identical, in this particular case it would result in one side of the insert being a left-orientated insert and the other side being a right-orientated insert (the specific names here not being important, rather than one rake surface would only be suitable for a left insert-holder, and the other a right insert-holder, as described above. Thus, only in hindsight of versatility of production of this insert for different insert-holders would this be considered. Such insert not having more cutting edges for an end user over DE 298 15 761 U1, but rather only an advantage for a manufacturer.

In any case, clearly the preceding aspects are more advantageous than the third aspect, which itself is still advantageous in a specific manner over the known prior art.

Notably, while the preferred embodiment of a bar-peeling insert shown below is formed with a screw hole, which is preferred for all aspects above, it will be understood that an alternative option is for the bar-peeling insert to be devoid of a screw hole and clamped, for example, with a top-clamp as known in the art. Nonetheless it is preferred that the bar-peeling insert comprise a screw-hole extends through the first rake surface and the second surface.

In accordance with a fourth aspect of the subject matter of the present application, there is provided a square-shaped bar-peeling insert comprising: a first rake surface and a second surface located opposite thereto; an insert axis (As) extending through centers of both the first rake surface and the second surface; an insert peripheral surface connecting the first rake surface and second surface, the insert peripheral surface comprising first, second, third and fourth peripheral sub-surfaces and first, second, third and fourth corners connecting adjacent peripheral sub-surfaces; and a first cutting edge extending along an intersection of the insert peripheral surface and the first rake surface, the first cutting edge comprising a sub-cutting edge between each pair of adjacent corners; wherein, in a plan view of the first rake surface, each sub-cutting edge comprises: a centrally located straight wiper sub-edge; and first and second peeling sub-edges being located on opposite sides of the wiper sub-edge; the first peeling sub-edge being at least partially curved and connecting the wiper sub-edge to a first corner edge of a first corner of one of said pairs of adjacent corners; the second peeling sub-edge being at least partially curved second peeling sub-edge connecting the wiper sub-edge to a second corner edge of a second corner of the same pair of adjacent corners as the first corner; in said plan view of the first rake surface: the centrally located straight wiper sub-edges define an imaginary square (S) bounding the insert; the first, second, third and fourth corners are spaced inwardly from the imaginary square; sides of the imaginary square have an insert side length SL; and the wiper sub-edge has a wiper length WL.

Preferred yet optional features of the bar-peeling insert according to any of the aspects above are as follows.

The second surface can preferably be a rake surface comprising a cutting edge (also called below a "second cutting edge") along the intersection thereof with the insert peripheral surface. A chip forming groove or construction can preferably extend adjacent the cutting edge.

In a plan view of the first rake surface: each of the first, second, third and fourth corners are preferably located spaced inwardly from the imaginary square.

In a plan view of the second surface when it is a rake surface: each of the first, second, third and fourth corners are preferably located spaced inwardly from an imaginary square formed by the wiper sub-edges of the second surface.

The insert peripheral surface preferably extends perpendicular relative to both the first rake surface and second surface.

Preferably a peeling sub-edge comprises a primary sub-edge connected to said wiper sub-edge and a secondary sub-edge connected at one side thereof to the primary sub-edge and at the other side thereof to said corner; wherein, in a plan view of the rake surface on which the peeling sub-edges is located, the primary sub-edge is more curved than the secondary sub-edge.

Preferably, each of the first and second peeling sub-edges of the bar-peeling insert comprise said primary sub-edge and said secondary sub-edges, in which each respective primary sub-edge is more curved than the adjacent secondary sub-edge.

To explain, as mentioned, bar-peeling is an extremely rough machining operation and hence as large a curvature as possible (extending from a straight wiper sub-edge) is desirable to prevent breakage. However, said curvature also increases the lead angle K and hence increase the load on the peeling sub-edge. Consequently, it is preferred that the secondary sub-edge be straighter than the primary sub-edge, most preferably straight, resulting in a lower lead angle K. This has allowed the preferred embodiment to have a lead angle K fulfilling the condition: $15°<K<25°$, more preferably $18°<K<22°$.

Preferably, in a plan view of a rake surface, the secondary sub-edge is straight.

It will be understood that both the peeling sub-edge and wiper sub-edges are functional and need to be balanced. Preferably, in a plan view of a rake surface, the length of one of the sides of the imaginary square defines an insert side-length SL, and the length of each wiper sub-edge in the same view defines a wiper length WL; wherein the insert fulfills the following condition: $WL/SL<0.6$, more preferably $WL/SL<0.5$, and most preferably $WL/SL<0.45$. Nonetheless it is believed advantageous for the wiper length WL not to be overly small so as to not provide a beneficial finish/stabilizing effect. Accordingly, preferably the insert fulfills the following condition: $WL/SL>0.20$, more preferably $WL/SL>0.30$ and most preferably $WL/SL>0.35$.

For a greater operational length of an insert side, the corner size can be reduced. Preferably, each corner has a corner radius smaller than any of said first and second peeling sub-edges. Since the primary sub-edge has a smaller radius than the secondary sub-edge, preferably each corner has a corner radius smaller than any of said primary sub-edges. Restated, each corner lies on a portion of a first circle and each primary sub-edge lies on a portion of a second circle, the first circle having a smaller radius than the second circle.

In a plan view of the first rake surface, the length of one of the sides of the imaginary square defines an insert side-length SL, and the length of each peeling sub-edge in a parallel direction to an adjacent one of the sides of the imaginary square, defines a peeling length PL; wherein, preferably, the insert fulfills the following condition: $PL/SL<0.3$, more preferably $PL/SL<0.25$. The peeling sub-edge is functional and preferably should not be overly small. Accordingly, it is preferable for the insert to fulfill the following condition: $PL/SL>0.10$, more preferably $PL/SL>0.15$.

Preferably at least one, and more preferably both, of the first cutting edge and second cutting edge is 90° rotationally symmetric about an insert axis extending through the centers of both the first rake surface and the second surface.

In view of the explanation above, in accordance with a fifth aspect of the subject matter of the present application, there is provided a bar-peeling insert comprising a cutting edge; wherein along one side of the bar-peeling insert defined between first and second adjacent corners of the bar-peeling insert, the cutting edge comprises: a straight wiper sub-edge and a first peeling sub-edge connecting the wiper sub-edge to the first corner; the wiper sub-edge being longer than the first peeling sub-edge and wherein the peeling sub-edge comprises a primary sub-edge connected to said wiper sub-edge and a secondary sub-edge connected at one side thereof to the primary sub-edge and at the other side thereof to said corner; and wherein the primary sub-edge is more curved than the adjacent secondary sub-edge.

Preferred yet optional features of the bar-peeling insert according to any of the aspects above are as follows.

Preferably the secondary sub-edge is straight in a plan view of the rake surface of the bar-peeling insert. This can allow a relatively small, but not overly small, lead angle.

While the curved primary sub-edge could comprise of a plurality of different curvatures, it is preferred for manufacturing simplicity for it to comprise a single curvature (i.e. radius).

Preferably the wiper length WL is significantly longer than the peeling length PL as detailed above and for the reasons explained above in connection with bar-peeling operations. Preferably, the insert fulfills the following condition: $PL/WL<0.75$, more preferably $PL/WL<0.65$. The peeling sub-edge is functional and preferably should not be overly small. Accordingly, it is preferable for the insert to fulfill the following condition: $PL/WL>0.35$, more preferably $PL/WL>0.45$.

Since it is preferred that the peeling sub-edge be robust, it is preferred that a majority thereof be curved. Accordingly, it is preferred that a primary sub-edge's length, primary length P1L, be longer than a secondary sub-edge's length, secondary length P2L. Stated differently, preferably: $P2L/P1L<0.50$, more preferably $P2L/P1L<0.40$. Nonetheless to gain the advantage of a small lead angle the length of the secondary sub-edge must have significance. Accordingly, preferably: $P2L/P1L>0.20$, more preferably $P2L/P1L>0.30$.

Preferably the lead angle K fulfills the condition: $15°<K<25°$, more preferably $18°<K<22°$.

While this particular cutting edge design is considered independently inventive, it clearly can be combined with any of the previous bar-peeling insert aspects above for even more benefits.

In accordance with a sixth aspect of the subject matter of the present application, there is provided a bar-peeling insert-holder comprising: a shank portion and a cutting portion; the cutting portion comprising first and second insert pockets opening out in the same direction; each of the first and second insert pockets comprising a pocket base surface and first and second pocket side surfaces extending from the pocket base surface; wherein, in a plan view of each respective pocket base surface: the first and second pocket side surfaces define two sides of an imaginary square; and the imaginary square of said each pocket base surface is rotated relative to the imaginary square of the other pocket base surface.

As will become clear below the versatile design of the bar-peeling insert allows it to be used as both a roughing bar-peeling insert or a finishing bar-peeling insert.

While FR 2 483 819 appears to show an embodiment in which identical inserts are used together, the lack of a significant wiper sub-edge seems to be the cause for the need to use three insert pockets instead of only two in the present aspect. And even with three inserts it is believed the wiper sub-edges of the present invention will provide a better finish, as well as other advantages (such as the comparatively long cutting edge, and additional edges per insert).

Given that the bar-peeling insert is square-shaped, the insert pockets can have a corresponding shape. Preferably, the first and second pocket side surfaces of each of the respective first and second insert pockets extend along adjacent sides of the imaginary square.

The first insert pocket (i.e. the insert pocket intended to hold the roughing bar-peeling insert) can preferably comprise a third pocket side surface extending from the pocket base surface, wherein, in a plan view of the pocket base surface of the first insert pocket the third pocket side surface defines a side of said imaginary square of the first insert pocket. Notably, in the present preferred yet non-limiting embodiment said third pocket side surface is not used to abut the bar-peeling insert and hence has only been added for protecting the bar-peeling insert from damage. It is however conceivable that a different abutment arrangement could be utilized in which the bar-peeling insert abuts the third pocket side surface.

Preferably, the second insert pocket (i.e. the insert pocket intended to hold the finishing bar-peeling insert) comprises a third pocket side surface extending from the pocket base surface, wherein, in a plan view of the pocket base surface of the second insert pocket the third pocket side surface defines a side of said imaginary square of the second insert pocket.

Preferably, one of the first and second pocket side surfaces of the second insert pocket is parallel with an elongation direction of the insert-holder.

As is known in the art, a shim can be used to protect an insert-holder from being damaged when a bar-peeling insert breaks. Preferably the shim is made of a harder material than the insert-holder, typically cemented carbide.

During development of the present invention the standard shim design of a bushing coaxial with the screw hole of the insert was less preferred than the following design concept.

Due to the unusually large size of the bar-peeling insert when compared with cutting inserts used for other machining operations, there was sufficient space to provide a pocket base surface with a centrally located screw hole for the bar-peeling insert and in addition two shim-screw-holes spaced apart from the centrally located screw hole. Since they are not centrally located, it is preferably that there be more than one shim-screw-holes to provide stability. While it appears to be a less elegant solution than a single centrally located screw hole used for both a cutting insert and a shim, and requires additional parts such as two separate screws to secure the shim alone, this is a preferred design, hitherto unknown to the inventors, which reduces the need for the relatively complex shim.

Preferably, both of the first and second insert pockets are surrounded at least one of the pocket base surfaces is formed with a centrally located screw hole and two shim-screw-holes spaced apart from the centrally located screw hole.

Accordingly, in accordance with a seventh aspect of the subject matter of the present application, there is provided an insert-holder comprising an insert pocket having a pocket base surface formed with a centrally located screw hole and two shim-screw-holes spaced apart from the centrally located screw hole.

In accordance with an eighth aspect of the subject matter of the present application, there is provided planar shaped shim comprising opposing first and second shim sides and a shim peripheral edge connecting the first and second shim sides; the shim further being formed with a centrally located screw-hole and two shim-screw-holes spaced apart from the centrally located screw hole. Preferably the screw-hole is larger in diameter than each of the two shim-screw-holes.

In accordance with a ninth aspect of the subject matter of the present application, there is provided a tool assembly comprising an insert-holder according to the sixth or seventh aspects and at least one shim according to the eighth aspect.

In accordance with a tenth aspect of the subject matter of the present application, there is provided a bar-peeling tool assembly comprising an insert-holder according to any one of the sixth or seventh aspects, and at least one bar-peeling insert according to any one of the first to fifth aspects.

It will be understood that the bar-peeling tool assembly can also preferably comprise a shim according to the eighth aspect.

Preferably the bar-peeling tool assembly comprises two (first and second) bar-peeling aspects according to the aspects above, which are mounted respectively in first and second insert pockets of the insert-holder.

Preferably, the first insert is orientated such that at least one peeling sub-edge and a wiper sub-edge of one side of the bar-peeling insert positioned to contact a bar workpiece and the second insert is oriented such that at least a wiper sub-edge is positioned to contact a bar workpiece, said wiper sub-edge of the second insert being positioned to be basically parallel with the elongation direction of the bar.

Preferably, the first insert is orientated such that both the first and second peeling sub-edges and the wiper sub-edge thereof is positioned to contact a bar workpiece.

Preferably, the second insert is orientated such that the first peeling sub-edge thereof, which is located closer than the second peeling sub-edge thereof to the first insert, is positioned to contact the bar workpiece.

Preferably, the second insert is orientated such that the second peeling sub-edge thereof, is positioned to not contact the bar workpiece.

It will be understood that inserts mentioned in the specification and claims are bar-peeling inserts, and that the word "insert" is occasionally mentioned without the preceding word "bar-peeling" for conciseness only. Similarly, the words "insert-holder" or "assembly" may appear in the abbreviated form. The only exception to this statement is in relation to the shim aspect and the related insert-holder and assembly aspect, which is believed to be an advantageous design for cutting inserts even which are not bar-peeling aspects.

BRIEF DESCRIPTION OF THE DRAWINGS

For a better understanding of the subject matter of the present application, and to show how the same may be carried out in practice, reference will now be made to the accompanying drawings, in which:

FIG. 3B is a plan view of the insert in FIG. 3A and an imaginary dashed-square;

FIG. 3C is a side view of the insert in FIG. 3A;

FIG. 3D is a sectional view taken along line IIID-IIID in FIG. 3B;

FIG. 4A is a perspective view of a portion of an insert-holder according to an inventive aspect the present invention, and which is also used in the tool assembly of FIG. 1, imaginary hatch-lines are used to show intended abutment regions;

FIG. 4B is a plan view of the portion of the insert-holder in FIG. 4A and imaginary dashed-squares;

FIG. 4C is a side view of the insert in FIG. 4A;

DETAILED DESCRIPTION

Figure 1:
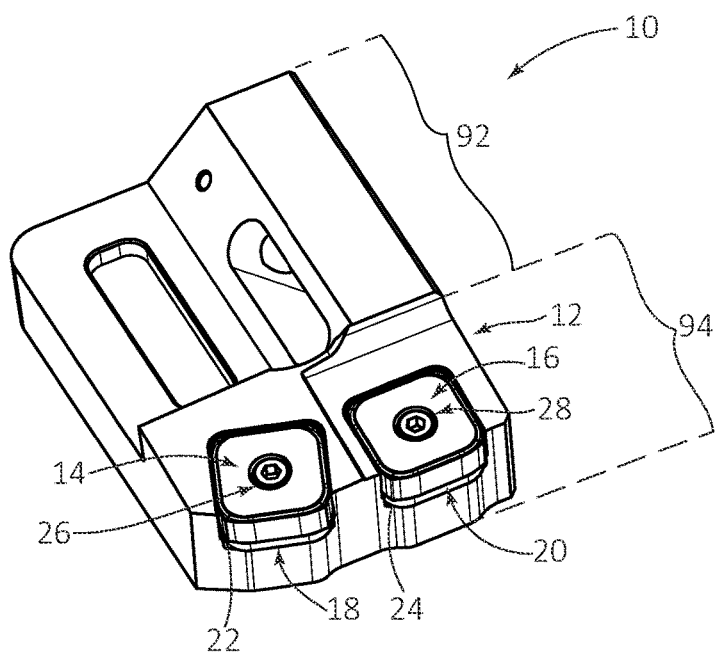
FIG. 1 is a perspective view of a tool assembly according to an inventive aspect the present invention.
Figure 2A:
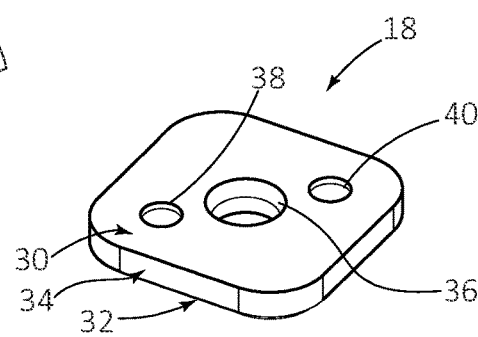
FIG. 2A is a perspective view of a shim according to a separately inventive aspect of the present invention, and which is also used in the tool assembly of FIG. 1.
Figure 3A:
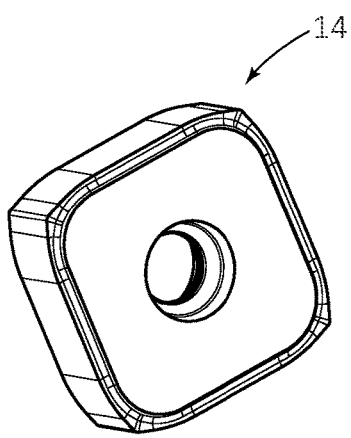
FIG. 3A is a perspective view of a bar-peeling insert according to an inventive aspect the present invention, and which is also used in the tool assembly of FIG. 1.
Figure 2B:
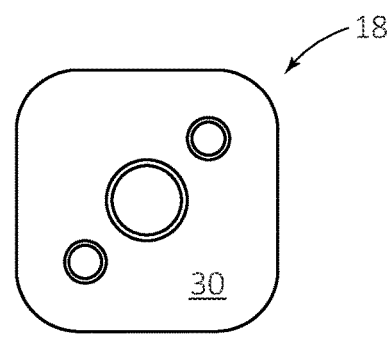
FIG. 2B is a plan view of the shim in FIG. 2A.

Referring to FIG. 1, a bar-peeling tool assembly 10 is shown. The assembly 10 comprises an insert-holder 12, and two identical inserts 14, 16 that in their respective positions and orientations in the insert-holder 12 function as a roughing insert 14 and a finishing insert 16, identical first and second shims 18, 20 respectively located between the roughing insert 14 and the finishing insert 16 and respective first and second insert pockets 22, 24 to which they are mounted.

The roughing insert 14 is secured to the first insert pocket 22 by a screw 26. The finishing insert 16 is similarly secured to the second insert pocket 22 by another screw 28.

Referring also to FIGS. 2A, 2B, 3A and 4A, only the first shim 18 out of the two identical shims will be described.

The first shim 18 is made of cemented carbide and has a planar (or, alternatively stated, plate) shape. More precisely, the first shim 18 comprises opposing first and second shim sides 30, 32 and a shim peripheral edge 34.

The first shim 18 is formed with a centrally located screw-hole 36 and two shim-screw-holes 38, 40 spaced apart from the centrally located screw-hole.

Since the centrally located screw-hole 36 is for a larger screw 26 (due to the larger forces on the roughing insert 14 (or even the finishing insert 16) it has a larger in diameter than each of the two shim-screw-holes 38, 40.

In assembly, two separate screws (not shown) are used to secure the first shim to threaded first and second shim screw-holes 38, 40 formed in the first insert pocket 22. The standard screws are, however, chosen (configured) to be flush or remain under the first shim side so as not to interfere with the stable mounting of the roughing insert 14.

With the first shim 18 secured, subsequently the roughing insert 14 can be secured to the first insert pocket 22 with the screw 26.

Referring now to FIGS. 3A to 3D, the roughing insert 14 will be described in detail (similar to the shims, only one insert, the roughing insert 14, out of the two identical inserts will be described).

The roughing insert 14 comprises a first rake surface 42, a second surface 44 (in this example also being a "second rake surface" 44, with a plan view not shown since the second surface 44 is identical to the view of the first rake surface 42 in FIG. 3B), an insert peripheral surface 46 connecting the first rake surface 42 and second surface 44. Since both the first rake surface 42 and second surface 44 are identical, only the first rake surface 42 will be described in detail.

It will be understood from the different views that the insert peripheral surface 46 extends perpendicular relative to both the first rake surface 42 and second surface 44, and hence the roughing insert 14 is a so-called negative cutting insert.

The roughing insert 14 comprises four identical sides, only one of which will be described in detail.

To elaborate, the insert peripheral surface 46 can be considered to comprise first, second, third and fourth peripheral sub-surfaces 48, 50, 52, 54 and first, second, third and fourth corners 56, 58, 60, 62 connecting the first, second, third and fourth peripheral sub-surfaces 48, 50, 52, 54.

The roughing insert 14 comprises a screw-hole 64 extending through the centers of the first rake surface 42 and the second surface 44. As mentioned above, such a bar-peeling insert could alternatively be a solid insert (i.e. devoid of a screw-hole) if a different clamping method is desired.

A first cutting edge 66 extends along an intersection of the insert peripheral surface 46 and the first rake surface 42. In this preferred example the first cutting edge 66 extends along the entire insert peripheral surface 46.

More precisely, the first cutting edge 66 comprises a first sub-cutting-edge 68 adjacent the first peripheral sub-surface 48, a second sub-cutting-edge 70 adjacent the second peripheral sub-surface 50, a third sub-cutting-edge 72 adjacent the third peripheral sub-surface 52 and a fourth sub-cutting-edge 74 adjacent the fourth peripheral sub-surface 54.

Since the roughing insert 14 is four-way (90°) indexable, only the first sub-cutting-edge 68 will be described in detail.

In a plan view of the first rake surface 42 (i.e. FIG. 3B), the first sub-cutting edge 68 comprises a centrally located straight wiper sub-edge 76, a first peeling sub-edge 78 connecting at one side thereof to the first corner 56 (or more precisely to a first corner edge 80 formed at the intersection of the first corner 56 and the first rake surface 42), and second peeling sub-edge 82 connecting at the other side thereof to the second corner 62 (or more precisely to a second corner edge 84).

The first peeling sub-edge 78, noting that all the peeling sub-edges are identical, comprises a primary sub-edge 86 connected to said wiper sub-edge 76 and a secondary sub-edge 88 connected to the first corner 56 (or more precisely to the first corner edge 80).

Preferably, the primary sub-edge 86 is more curved (in the plan view shown in FIG. 3) than the secondary sub-edge 88 (which in this preferred example is straight).

As shown in FIG. 3B, both the first and second peeling sub-edges are mirror symmetric about the center C of the wiper-sub-edge 76 which is bisected by the plane $P_M$ (which extends through the center of the insert and more precisely through the centers of the wiper-sub-edges belonging to sub-cutting edges 72, 76 found on opposite sides of the first rake surface 42).

Notably, an insert axis $A_S$, which also serves as a screw-hole-axis, extends through the center of the screw-hole 64 and lies in the plane $P_M$.

The roughing insert 14 has 90° rotational symmetry about the insert axis $A_S$ on the first rake surface 42 and also on the second rake surface 44. Thus, on each side, the roughing insert 14 has four way rotational indexability, relative to the screw-hole-axis $A_S$.

Reverting to the first cutting edge 66, it is preferred that all cutting edges be located adjacent to a chip-former arrangement, such as a groove 90, which in this preferred example extends adjacent to the entire cutting edge 66.

As seen in FIG. 3B, each of the wiper sub-edges 76 forms an imaginary square S, i.e., the four wiper edges all lie on different sides of the imaginary square.

For the sake of completeness, notably not only the wiper sub-edges on the first rake surface, but also in an identical view (not shown) of the second surface a similar imaginary square (not shown) would be presented, and indeed portions of the insert peripheral surface between the wiper sub-edges on the first rake surface and second surface would also fall within planes connecting the two imaginary squares. As such the eight wiper sub-edges (four associated with each rake surface) are considered to have negative (or at least neutral) geometry.

Further, the first cutting edge 66, or more precisely the wiper sub-edges 76 thereof define an inscribed circle IC having a diameter D. The diameter D in this preferred example being about 35 mm.

The diameter D is also equal in length to an insert side-length SL length of the imaginary square S.

Notably a wiper length WL is longer than a peeling length PL.

The wiper length WL in this preferred example is about 14 mm.

The peeling length PL in this preferred example is about 8 mm.

It should be further noted that in the preferred embodiment the insert side-length SL length is still larger than even the sum of the wiper length WL and twice the peeling length PL.

Similarly, a primary length P1L associated with the primary sub-edge 86 is preferably longer than a secondary length P2L associated with the secondary sub-edge 88.

The primary length P1L in this preferred example is about 6 mm.

The secondary length P2L in this preferred example is about 2 mm.

Referring now to FIG. 1, the insert-holder 12 comprises a shank portion 92 and a cutting portion 94.

Referring to FIGS. 4A to 4C the cutting portion 94 will be described in more detail.

As mentioned above, in the preferred embodiment the cutting portion 94 comprises first and second insert pockets 22, 24 opening out in the same direction.

The first insert pocket 22 comprises a pocket base surface 96 and circumferentially adjacent first and second pocket side surfaces 98, 100 extending from the pocket base surface 96. In a plan view (FIG. 4B) of the pocket base surface 96 surface, the first and second pocket side surfaces 98, 100 defining two circumferentially adjacent sides of a first imaginary square 51.

All of the pocket abutment surfaces (shown with schematic hatching in FIG. 4A) of the first insert pocket 22 are formed on the first and second pocket side surfaces 98, 100.

Specifically, the first pocket side surface 98 comprises a first pocket abutment surface 102 which in this preferred embodiment is adjacent a front end 104 of the insert-holder 12. While difficult to see, the adjacent region 106 of the first pocket side surface 98 is recessed slightly rearwardly of the first pocket abutment surface 102 to ensure contact of the roughing insert 14 with the intended abutment area, i.e. the first pocket abutment surface 102.

Additionally, the second pocket side surface 100, which is the furthermost pocket side surface from the front end 104, comprises a second pocket abutment surface 108 and a third pocket abutment surface 110 which are separated by a relief recess 112.

The first insert pocket 22 further comprises a third pocket side surface 114 which in this non-limiting embodiment is intended not to contact the roughing insert 14.

Thus in the preferred arrangement shown, the roughing insert 14 only contacts the pocket base surface 96 (or more precisely, in this embodiment which comprises shims, the first shim 18 which in turn contacts the pocket base surface 96) and only the first, second and third pocket abutment surfaces 102, 108, 110.

It will be understood that it is possible that a different abutment arrangement could conceivably include an abutment surface on the third pocket side surface 114.

The second insert pocket 24 is basically identical to the first insert pocket 22 and hence will only be described briefly.

The second insert pocket 24 comprises a pocket base surface 116, circumferentially adjacent first and second pocket side surfaces 118, 120 which define two sides of a second imaginary square S2. In a plan view of the insert holder's cutting portion 94 (FIG. 4B), the pocket base surface 116 of the second insert pocket 24 and the pocket base surface 96 of the first insert pocket 22 face in the same direction. However, in the plan view, the angular orientation of the first pocket 22 differs from the angular orientation of the second pocket 24. Therefore, the imaginary squares S1, S2 of the two pockets 22, 24, respectively, are rotated relative to each other in said plan view, such rotation being around a center of a corresponding imaginary square S1 or S2.

All of the pocket abutment surfaces (shown with schematic hatching in FIG. 4A) of the second insert pocket 24 are formed on the first and second pocket side surfaces 118, 120.

Specifically, the first pocket side surface 118 comprises a first pocket abutment surface 122. The second pocket side surface 120 comprises a second pocket abutment surface 124 and a third pocket abutment surface 126 which are separated by a relief recess 128.

The second insert pocket 24 further comprises a third pocket side surface 129 which in this non-limiting embodiment is intended not to contact the finishing insert 16.

Thus in the preferred arrangement shown, the finishing insert 16 only contacts the pocket base surface 116 (or more precisely, in this embodiment which comprises shims, the second shim 20 which in turn contacts the pocket base surface 116) and only the first, second and third pocket abutment surfaces 122, 124, 126.

Corresponding to the first shim 18, the pocket base surface 96 of the first insert pocket 22 is formed with a centrally located threaded screw-hole 130 and two threaded shim-screw-holes 132, 134 spaced apart from the centrally located screw-hole 130 (with a corresponding construction formed in the second insert pocket 24).

The third pocket side surface 114, or more precisely the first pocket wall 114A which comprises the third pocket side surface 114, of the first insert pocket 22 is not used for abutment and hence is not essential. Nonetheless it can provide a protection function as described above.

For the sake of completeness, a second wall 98A separates the first and second insert pockets 22, 24 and comprises the first pocket side surface 98 of the of the first insert pocket 22 and on an opposing side the third pocket side surface 129 of the second insert pocket 24.

Additionally, a third wall 118A comprises the first pocket side surface 118 of the second insert pocket 24.

With regards to the rotated position of the first and second insert pockets 22, 24, it is noted that the second and third abutment surfaces 124, 126 of the second insert pocket 24 (and the second pocket side surface 120 on which they are formed) are basically perpendicular to an elongation direction (defined by an elongation axis $A_E$) of the insert-holder 12.

To define the angular rotation of the pockets in an alternate manner, in a plan view of the cutting portion 94 of the insert holder 12 (FIG. 4B), the first insert pocket 22 has a first normal N1 which is perpendicular to that insert's second pocket side surface 100 (and more precisely, perpendicular to the second pocket abutment surface 108 and the third pocket abutment surface 110 thereof) and bisects the first imaginary square S1. Meanwhile the second insert pocket 24 has a second normal N2 which is perpendicular to that insert's second pocket side surface 120 (and more precisely, perpendicular to the second pocket abutment surface 124 and a third pocket abutment surface 126 thereof) and bisects the second imaginary square S2. The first normal N1 and the second normal N2 form an acute angle α. In some embodiments the angle α is between 30° and 50° (i.e. 30°≤α≤50°), and preferably: 35°≤α≤45°. The second normal N2 may be parallel to the elongation axis $A_E$ of the insert holder 12.

Figure 5A:
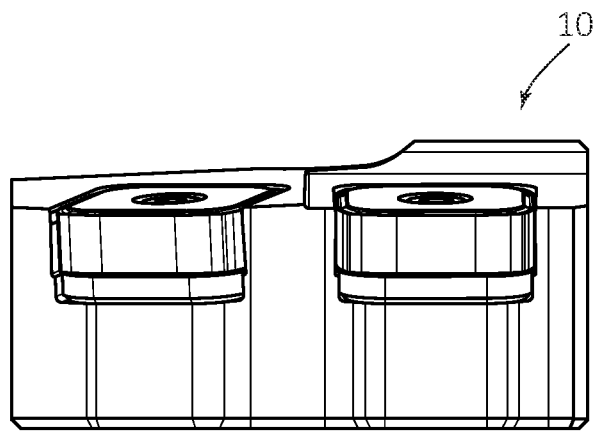
FIG. 5A is a side perspective view of the tool assembly in FIG. 1.
Figure 5B:
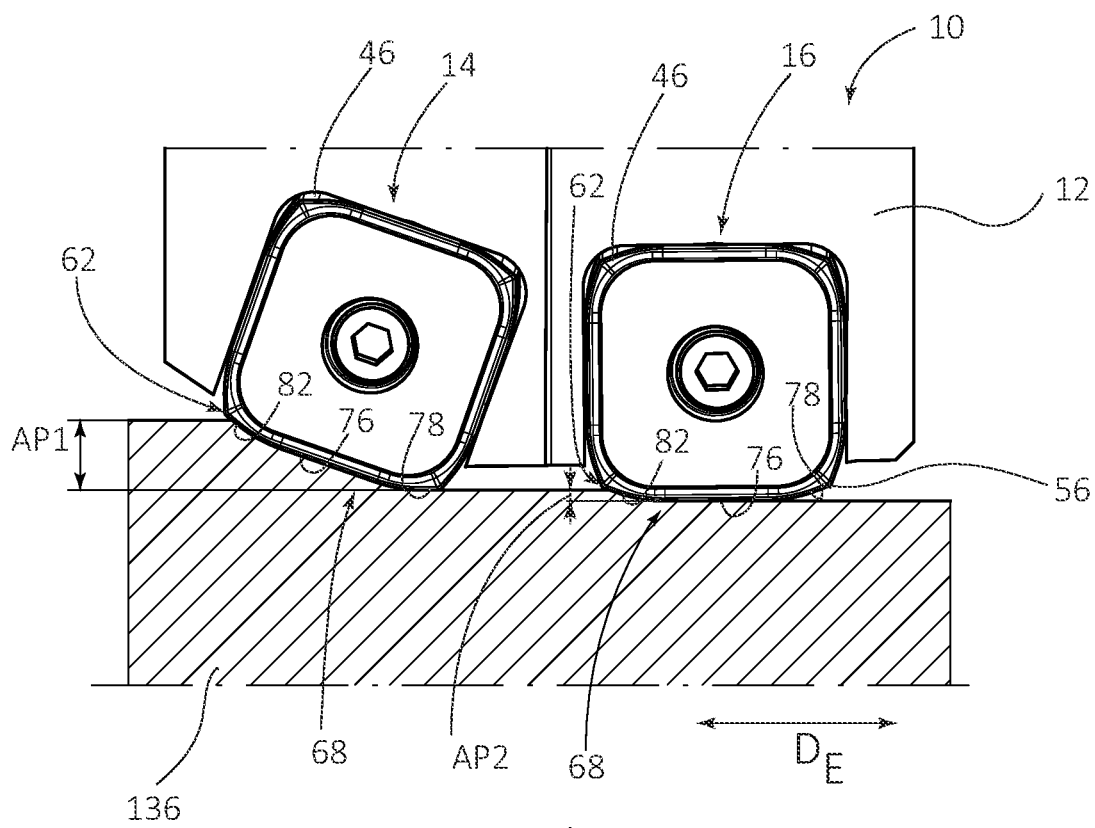
FIG. 5B is a near-plan view (i.e. slightly non-perpendicular to the insert-holder top surface as will be explained below) of a portion of the assembly in FIG. 5A, shown schematically carrying out a bar-peeling operation on a bar workpiece.

Referring to FIG. 5B, the operation of the bar-peeling tool assembly 10 on a bar 136 having an elongation direction $D_E$ will be described. In this figure, one cutting insert is seated in each insert pocket with an operative sub-cutting edge of that insert (in this example, sub-cutting edge 68) engaging the bar 136.

As noted above, the roughing and finishing inserts 14, 16 are negative inserts and therefore it is preferable that the insert-holder 12 provide relief with a negative orientation, which is visible in the fact that the peripheral insert surfaces 46 are slightly visible.

The roughing insert 14 is oriented to provide a roughing function (removal of a large amount of material) such that the entire first operative sub-cutting edge 68 (i.e. the wiper sub-edge 76 and both the first and second peeling sub-edges 78, 82 engage the bar 136 to remove material therefrom at a cut depth $A_{P1}$.

It should be understood that the cut depth $A_{P1}$ is very great and certainly can be reduced with less of the second peeling sub-edge 82 engaging the workpiece if the forces on the roughing insert 14 are too great in a particular application.

The second corner 62 is however not engaged due to the sharp and hence relatively breakable construction thereof.

Nonetheless, it will be understood that with the subsequent indexing of the roughing insert 14 virtually the entire cutting edge thereof is utilized.

Similarly, the finishing insert 16 is oriented to remove less material (noting the relatively much smaller cut depth $AP_2$ when compared to the cut depth Ari) and provides a finishing function with only one peeling sub-edge (the second peeling sub-edge 82) and the wiper sub-edge 76 engaging the bar 136.

Again, the second corner 62 is not engaged, and certainly not the first corner 56.

Notably the wiper sub-edge 76 of the finishing insert 16 is basically parallel with the elongation direction $D_E$ of the bar and hence provides not only a wiper function but also a stabilizing function as described above.

The description above includes an exemplary embodiment and does not exclude non-exemplified embodiments and details from the claim scope of the present application.

The invention claimed is:

1. A double-sided, square-shaped bar-peeling insert comprising:
    a first rake surface and a second surface located opposite thereto;
    an insert axis (As) extending through centers of both the first rake surface and the second surface;
    an insert peripheral surface connecting the first rake surface and second surface, the insert peripheral surface comprising first, second, third and fourth peripheral sub-surfaces and first, second, third and fourth corners connecting adjacent peripheral sub-surfaces; and
    a first cutting edge extending along an intersection of the insert peripheral surface and the first rake surface, the first cutting edge comprising a sub-cutting edge between each pair of adjacent corners;
    a second cutting edge extending along an intersection of the insert peripheral surface and the second surface;
    wherein, in a plan view of the first rake surface, each sub-cutting edge comprises:
        a centrally located straight wiper sub-edge; and
        first and second peeling sub-edges located on opposite sides of the wiper sub-edge;
    the first peeling sub-edge being at least partially curved and connecting the wiper sub-edge to a first corner edge of a first corner of one of said pairs of adjacent corners;
    the second peeling sub-edge being at least partially curved and connecting the wiper sub-edge to a second corner edge of a second corner of the same pair of adjacent corners as the first corner;
    each of said first and second peeling sub-edges comprising a primary sub-edge connected to said wiper sub-edge and a secondary sub-edge connected at one side thereof to the primary sub-edge and at the other side thereof to said corner;
    in said plan view of the first rake surface:
        the centrally located straight wiper sub-edges define an imaginary square bounding the insert;
        the first, second third and fourth corners are spaced inwardly from the imaginary square;
        sides of the imaginary square have an insert side length SL;
        the wiper sub-edge has a wiper length WL;
        the first peeling sub-edge has a length PL measured parallel to the straight wiper sub-edge;
        the primary sub-edge has primary length P1L measured parallel to the straight wiper sub-edge;
        the secondary sub-edge has a secondary length P2L measured parallel to the straight wiper sub-edge, with PL=P1L+P2L;
        the primary length P1L being longer than the secondary length P2L; and
        a lead angle (K) formed between the straight wiper sub-edge and the secondary sub-edge fulfills the condition 15°<K<25°.

2. The square-shaped bar-peeling insert according to claim 1, wherein the second cutting edge comprises a sub-cutting edge between each pair of adjacent corners; wherein, in a plan view of the second surface, each sub-cutting edge comprises: a centrally located straight wiper sub-edge; and first and second peeling sub-edges being located on opposite sides of the wiper sub-edge; the first peeling sub-edge being at least partially curved and connecting the wiper sub-edge to a first corner edge of a first corner of one of said pairs of adjacent corners; and the second peeling sub-edge being at least partially curved second peeling sub-edge connecting the wiper sub-edge to a second corner edge of a second corner of the same pair of adjacent corners as the first corner.

3. The square-shaped bar-peeling insert according to claim 1, wherein the insert peripheral surface extends perpendicular to both the first rake surface and second surface.

4. The square-shaped bar-peeling insert according to claim 1, wherein, in said plan view, the primary sub-edge is more curved than the secondary sub-edge.

5. The square-shaped bar-peeling insert according to claim 4, wherein, in said plan view, the secondary sub-edge is straight.

6. The square-shaped bar-peeling insert according to claim 1, wherein the insert fulfills the following condition: WL/SL<0.6.

7. The square-shaped bar-peeling insert according to claim 6, wherein the insert fulfills the following condition: WL/SL>0.20.

8. The square-shaped bar-peeling insert according to claim 1, wherein each corner has a corner radius smaller than any of said first and second peeling sub-edges.

9. The square-shaped bar-peeling insert according to claim 1, wherein: a length of each peeling sub-edge in a direction parallel to an associated one of the sides of the imaginary square, defines a peeling length PL; and the insert fulfills the following condition: PL/SL<0.3.

10. The square-shaped bar-peeling insert according to claim 9, wherein the insert fulfills the following condition: PL/SL>0.15.

11. The square-shaped bar-peeling insert according to claim 1, wherein the first cutting edge is 90° rotationally symmetric about the insert axis (As).

12. A bar-peeling tool assembly comprising a bar-peeling insert-holder having first and second insert pockets and first and second inserts according to claim 1, which are mounted respectively in the first and second insert pockets of the insert-holder, the first insert having a first operative sub-cutting edge and the second insert having a second operative sub-cutting edge.

13. The bar-peeling tool assembly according to claim 12, wherein the bar-peeling tool assembly is in contact with a bar workpiece having an elongation direction (DE), wherein: the first and second inserts both are in contact with the bar workpiece; the first insert is oriented such that a wiper sub-edge and at least one peeling sub-edge of the first operative sub-cutting edge contact the bar workpiece; the second insert is oriented such that at least a wiper sub-edge of the second operative sub-cutting edge contacts the bar workpiece; and the wiper sub-edge of the second operative sub-cutting edge is parallel to the elongation direction of the bar workpiece.

14. The bar-peeling tool assembly according to claim 13, wherein both peeling sub-edges of the first operative sub-cutting edge contact the bar workpiece.

15. The bar-peeling tool assembly according to claim 13, wherein the second operative sub-cutting edge has one peeling sub-edge in contact with the bar workpiece, said one peeling sub-edge being closer to the first insert than the other peeling sub-edge of the second operative sub-cutting edge.

16. The bar-peeling tool assembly according to claim 15, wherein said other peeling sub-edge of the second operative sub-cutting edge does not contact the bar workpiece.

17. The square-shaped bar-peeling insert according to claim 1, wherein the lead angle (K) fulfills the condition $18°<K<22°$.

18. The square-shaped bar-peeling insert according to claim 1, wherein:

$$0.20<P2L/P1L<0.50.$$

19. A square-shaped bar-peeling insert comprising:
a first rake surface and a second surface located opposite thereto;
an insert axis (As) extending through centers of both the first rake surface and the second surface;
an insert peripheral surface connecting the first rake surface and second surface, the insert peripheral surface comprising first, second, third and fourth peripheral sub-surfaces and first, second, third and fourth corners connecting adjacent peripheral sub-surfaces; and
a first cutting edge extending along an intersection of the insert peripheral surface and the first rake surface, the first cutting edge comprising a sub-cutting edge between each pair of adjacent corners;
wherein, in a plan view of the first rake surface, each sub-cutting edge comprises:
a centrally located straight wiper sub-edge; and
first and second peeling sub-edges located on opposite sides of the wiper sub-edge;
the first peeling sub-edge being at least partially curved and connecting the wiper sub-edge to a first corner edge of a first corner of one of said pairs of adjacent corners;
the second peeling sub-edge being at least partially curved and connecting the wiper sub-edge to a second corner edge of a second corner of the same pair of adjacent corners as the first corner;
each of said first and second peeling sub-edges comprising a primary sub-edge connected to said wiper sub-edge and a secondary sub-edge connected at one side thereof to the primary sub-edge and at the other side thereof to said corner;
in said plan view of the first rake surface:
the centrally located straight wiper sub-edges define an imaginary square bounding the insert;
the first, second third and fourth corners are spaced inwardly from the imaginary square;
sides of the imaginary square have an insert side length SL;
the wiper sub-edge has a wiper length WL;
the first peeling sub-edge has a peeling length PL measured parallel to the straight wiper sub-edge;
the primary sub-edge has a primary length P1L measured parallel to the straight wiper sub-edge;
the secondary sub-edge has a secondary length P2L measured parallel to the straight wiper sub-edge, with PL=P1L+P2L; and
the primary length P1L is longer than the secondary length P2L.

20. The square-shaped bar-peeling insert according to claim 19, wherein the insert is double-sided and further comprises a second cutting edge extending along an intersection of the insert peripheral surface and the second surface.

21. The square-shaped bar-peeling insert according to claim 20, wherein
a lead angle (K) formed between the straight wiper sub-edge and the secondary sub-edge fulfills the condition 18°<K<22°.

22. A double-sided, square-shaped bar-peeling insert comprising:
a first rake surface and a second surface located opposite thereto;
an insert axis (As) extending through centers of both the first rake surface and the second surface;
an insert peripheral surface connecting the first rake surface and second surface, the insert peripheral surface comprising first, second, third and fourth peripheral sub-surfaces and first, second, third and fourth corners connecting adjacent peripheral sub-surfaces; and
a first cutting edge extending along an intersection of the insert peripheral surface and the first rake surface, the first cutting edge comprising a sub-cutting edge between each pair of adjacent corners;
a second cutting edge extending along an intersection of the insert peripheral surface and the second surface;
wherein, in a plan view of the first rake surface, each sub-cutting edge comprises:
a centrally located straight wiper sub-edge; and
first and second peeling sub-edges located on opposite sides of the wiper sub-edge;
the first peeling sub-edge being at least partially curved and connecting the wiper sub-edge to a first corner edge of a first corner of one of said pairs of adjacent corners;
the second peeling sub-edge being at least partially curved and connecting the wiper sub-edge to a second corner edge of a second corner of the same pair of adjacent corners as the first corner;
each of said first and second peeling sub-edges comprising a primary sub-edge connected to said wiper sub-edge and a secondary sub-edge connected at one side thereof to the primary sub-edge and at the other side thereof to said corner;
in said plan view of the first rake surface:
the centrally located straight wiper sub-edges define an imaginary square bounding the insert;
the first, second third and fourth corners are spaced inwardly from the imaginary square;
each corner lies on a portion of a first circle and each primary sub-edge lies on a portion of a second circle, the first circle having a smaller radius than the second circle,
sides of the imaginary square have an insert side length SL;
the wiper sub-edge has a wiper length WL;
the first peeling sub-edge has a length PL measured parallel to the straight wiper sub-edge;
the primary sub-edge has primary length P1L measured parallel to the straight wiper sub-edge;
the secondary sub-edge has a secondary length P2L measured parallel to the straight wiper sub-edge, with PL=P1L+P2L;
the primary length P1L being longer than the secondary length P2L; and
a lead angle (K) formed between the straight wiper sub-edge and the secondary sub-edge fulfills the condition 15°<K<25°.

23. The square-shaped bar-peeling insert according to claim 1, wherein each corner has a corner radius smaller than any of said primary sub-edges.

* * * * *